(12) United States Patent
Chiang

(10) Patent No.: US 6,920,816 B2
(45) Date of Patent: Jul. 26, 2005

(54) VERTICAL SAW MACHINE

(76) Inventor: Pei-Lieh Chiang, No. 12, Nan-Ping Rd., Nan Dist., Taichung City (TW)

(*) Notice: Subject to any disclaimer, the term of this patent is extended or adjusted under 35 U.S.C. 154(b) by 0 days.

(21) Appl. No.: 10/194,020

(22) Filed: Jul. 11, 2002

(65) Prior Publication Data

US 2003/0209124 A1 Nov. 13, 2003

(30) Foreign Application Priority Data

May 10, 2002 (TW) ........................ 91206677 U

(51) Int. Cl.[7] ................ B23D 55/02; B27B 13/04
(52) U.S. Cl. ................................. 83/812; 83/788
(58) Field of Search .................. 83/809, 811, 822, 83/810, 432, 433, 565, 788, 859

(56) References Cited

U.S. PATENT DOCUMENTS

| 442,420 A | * | 12/1890 | Coan ........................ 83/812 |
| 490,212 A | * | 1/1893 | O'Connor .................. 83/812 |
| 1,296,488 A | * | 3/1919 | DuLaney ................ 83/812 X |
| 1,302,949 A | * | 5/1919 | Meyers ..................... 83/812 |
| 2,644,491 A | * | 7/1953 | Abraham ................... 83/811 |
| 3,733,952 A | * | 5/1973 | Fukugami et al. ...... 83/812 X |
| 4,882,962 A | * | 11/1989 | Terpstra et al. ........... 83/812 |
| 4,903,561 A | * | 2/1990 | De Varreux ............... 83/811 |
| 4,909,108 A | * | 3/1990 | Nakada et al. .......... 83/812 X |

* cited by examiner

Primary Examiner—Clark F. Dexter
(74) Attorney, Agent, or Firm—Trop, Pruner & Hu, P.C.

(57) ABSTRACT

A vertical saw machine includes a column with upper and lower supports carrying a motor to drive a saw blade. A table is disposed between the upper and lower supports for supporting a workpiece. The saw blade intersects the table with an included angle. The column is turnable between normal and inclined positions to vary the included angle. A frame post is mounted under the table to be positioned on the ground surface. A key slot and a key member are disposed respectively in and on the frame post and the column, and confine an arcuate guiding route to retainingly guide the column to move between the two positions.

4 Claims, 10 Drawing Sheets

VERTICAL SAW MACHINE

CROSS-REFERENCE TO RELATED APPLICATION

This application claims priority of Taiwan patent Application No. 091206677, filed on May 10, 2002.

BACKGROUND OF THE INVENTION

1. Field of the Invention

This invention relates to a vertical saw machine, more particularly to a vertical saw machine with a column which is turnable between normal and inclined positions to adjust an angle of the column relative to a table.

2. Description of the Related Art

Referring to FIGS. 1 and 2, a conventional vertical band saw machine 10 is shown to include a column 11 with upper and lower supports 111,112 which are spaced apart from each other to confine a working space 113 therebetween. A table 13 includes a horizontal support wall for supporting a workpiece, and extends into the working space 113. An endless band saw blade 12 is trained on two blade mounting pulleys (not shown) mounted on the upper and lower supports 111,112 so as to form an endless route, and has a front segment which intersects the horizontal support wall of the table 13 with an included angle therebetween. An adjustment member 131 is operated to adjust the included angle as desired so as to adjust an angle of the workpiece supported on the horizontal support wall relative to the front segment of the saw blade 12. However, in such an arrangement, the workpiece supported on the table 13 may tilt and slide down during sawing operation so that the operator needs to steady the workpiece, which is inconvenient.

SUMMARY OF THE INVENTION

The object of the present invention is to provide a vertical saw machine in which an included angle of a saw blade relative to a table can be adjusted without the need to tilt the table.

According to this invention, the vertical saw machine comprises a column which includes a rear body with upper and lower ends opposite to each other in a longitudinal direction, and upper and lower supports that respectively extend from the upper and lower ends forwardly and in a first direction transverse to the longitudinal direction, and that are spaced apart from each other in the longitudinal direction to confine a working space therebetween. A motor has an output shaft to deliver a drive force. A saw blade is driven by the drive force of the output shaft, and has a sawing portion which is running along a running route that is spaced apart from the rear body in the first direction. A table includes a horizontal support wall for supporting a workpiece, and extends into the working space. The sawing portion of the saw blade intersects the horizontal support wall with an included angle facing towards the rear body, and at a centerline which is parallel to the axis. The column is turnable about the centerline between a normal position, where the included angle is 90 degrees, and an inclined position, where the included angle is an obtuse or acute angle. A frame post includes a bottom end to be positioned on a ground surface, and a major mounting wall which extends from the bottom end in an upright direction that is parallel to the longitudinal direction when the column is in the normal position, and which terminates at an upper end proximate to the horizontal support wall. The major mounting wall has right and left lateral surfaces opposite to each other in the second direction. The right lateral surface confronts the column, and has a key slot which extends towards the left lateral surface and which is configured to confine a guiding route that is arcuate about the centerline. A key member has a proximate end which is secured to the column, and a distal end which extends from the proximate end in the second direction. As such, the distal end is retainingly guided to move along the guiding route and between first and second points which correspond to the normal and inclined positions.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENTS

Figure 1:
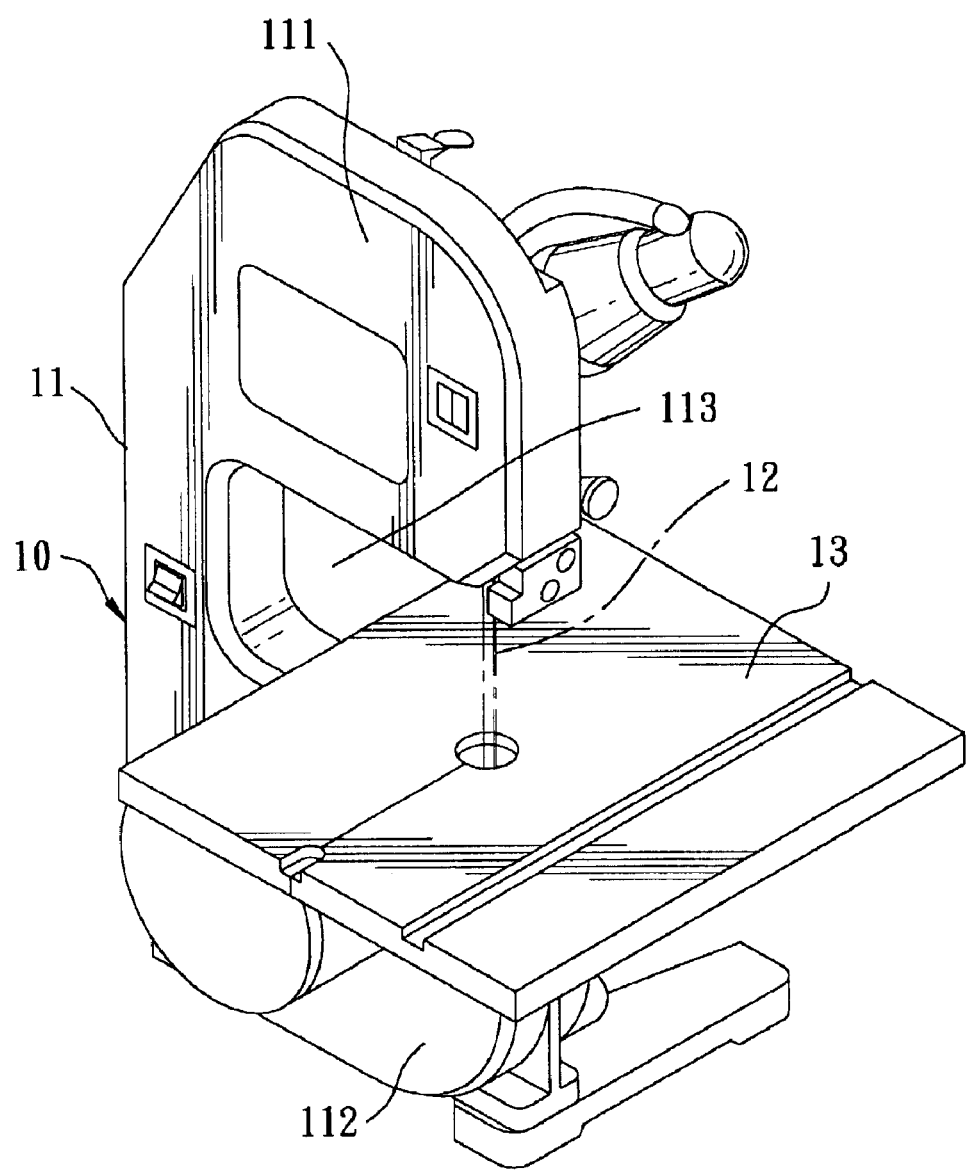
FIG. 1 is a perspective view of a conventional vertical band saw machine.
Figure 2:
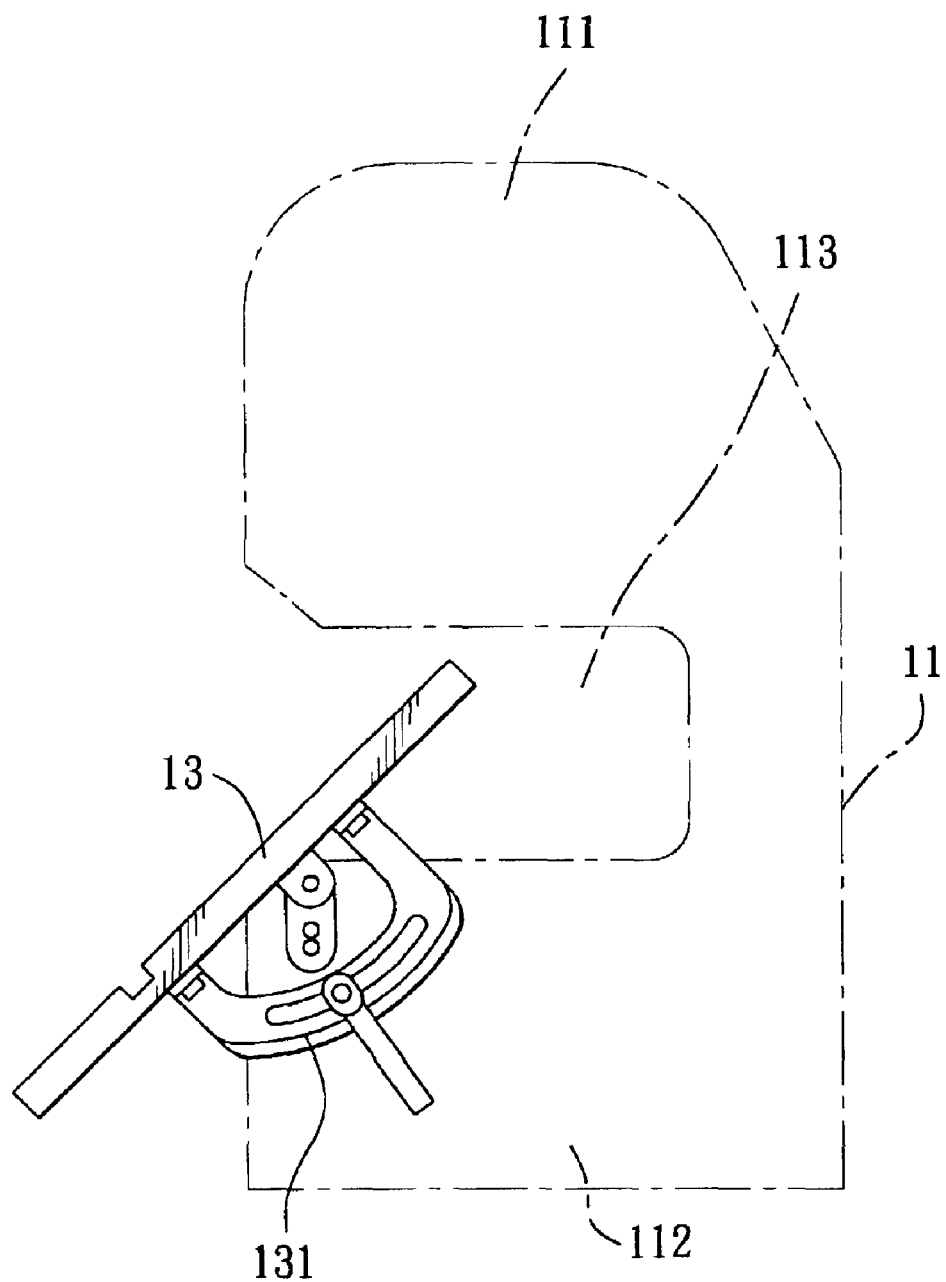
FIG. 2 is a schematic view of a table of the conventional vertical band saw machine in an inclined state.

Before the present invention is described in greater detail, it should be noted that same reference numerals have been used to denote like elements throughout the specification.

Referring to FIGS. 3 to 6, the preferred embodiment of a vertical saw machine according to the present invention is a vertical band saw machine, and is shown to comprise a column 20, a blade mounting pulley assembly 23, and an endless band saw blade 22.

The column 20 includes a rear body 21 which has upper and lower ends opposite to each other in a longitudinal direction, and upper and lower supports 211,212 which respectively extend from the upper and lower ends of the rear body 21 forwardly and in a first direction transverse to the longitudinal direction, and which are spaced apart from each other in the longitudinal direction to confine a working space 213 therebetween.

The blade mounting pulley assembly 23 includes a motor 234 which is received in a motor housing 233 and which has an output shaft 235 to deliver a drive force. The motor housing 233 has a proximate end secured on the lower support 212, and a distal end extending from the proximate end in a second direction that is transverse to both the longitudinal and first directions so as to serve as a key member.

The blade mounting pulley assembly 23 further includes upper and lower blade mounting pulleys 231,232 which are disposed respectively on and rotatable relative to the upper and lower supports 211,212 about first axes that are oriented in the second direction, and which are driven by the drive force of the output shaft 235.

The endless band saw blade 22 is trained on the upper and lower blade mounting pulleys 231,232 so as to be driven by the drive force of the output shaft of the motor to run, in sequence, along the lower support 212, the rear body 21 and the upper support 211, and then along a front running route which interconnects the upper and lower supports 211,212, thereby forming an endless route. The saw blade 22 has a front sawing portion 221 which is running along the front running route.

Figure 6:
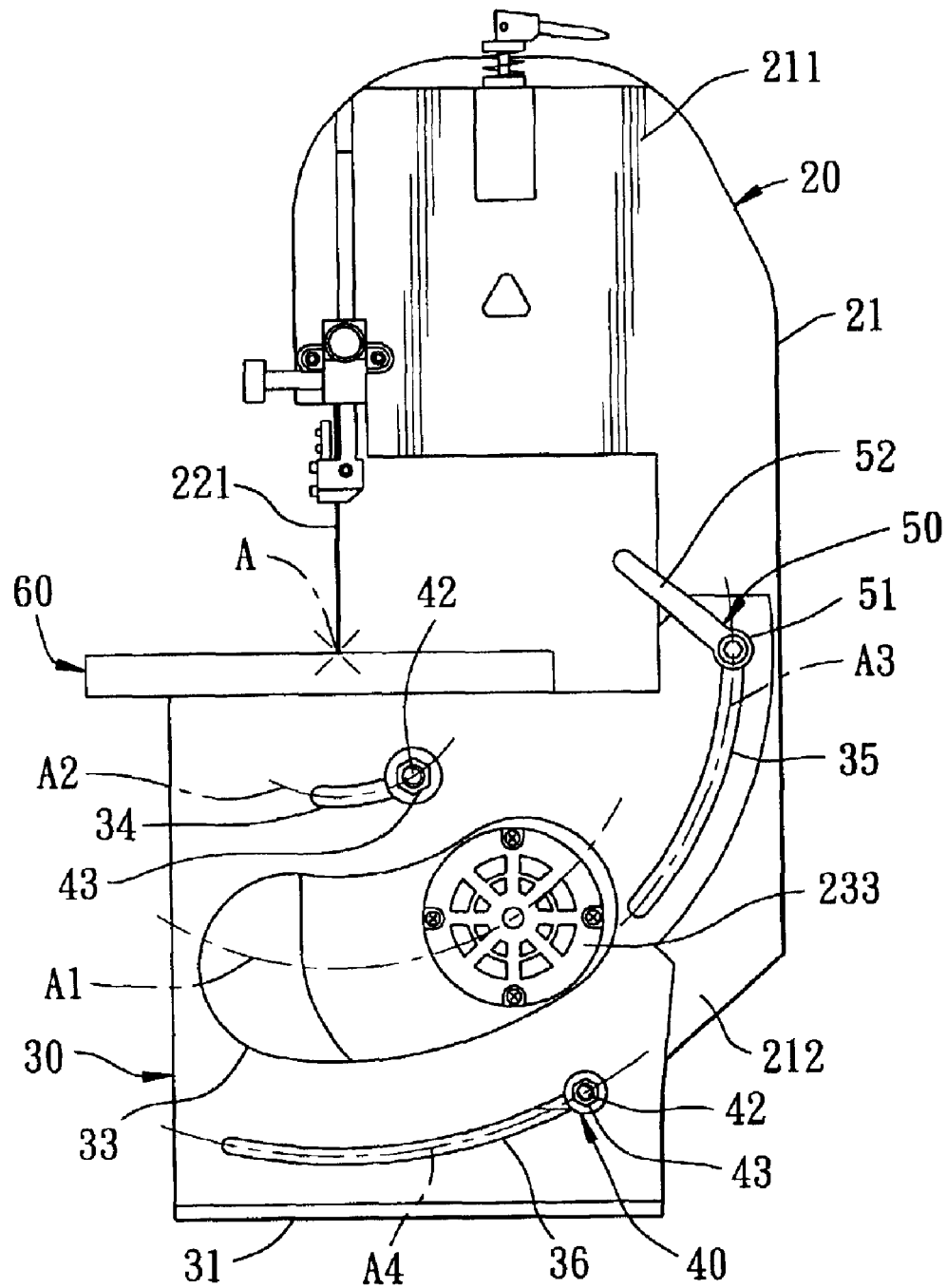
FIG. 6 is a side view of the preferred embodiment when the column is in a normal position.
Figure 7:
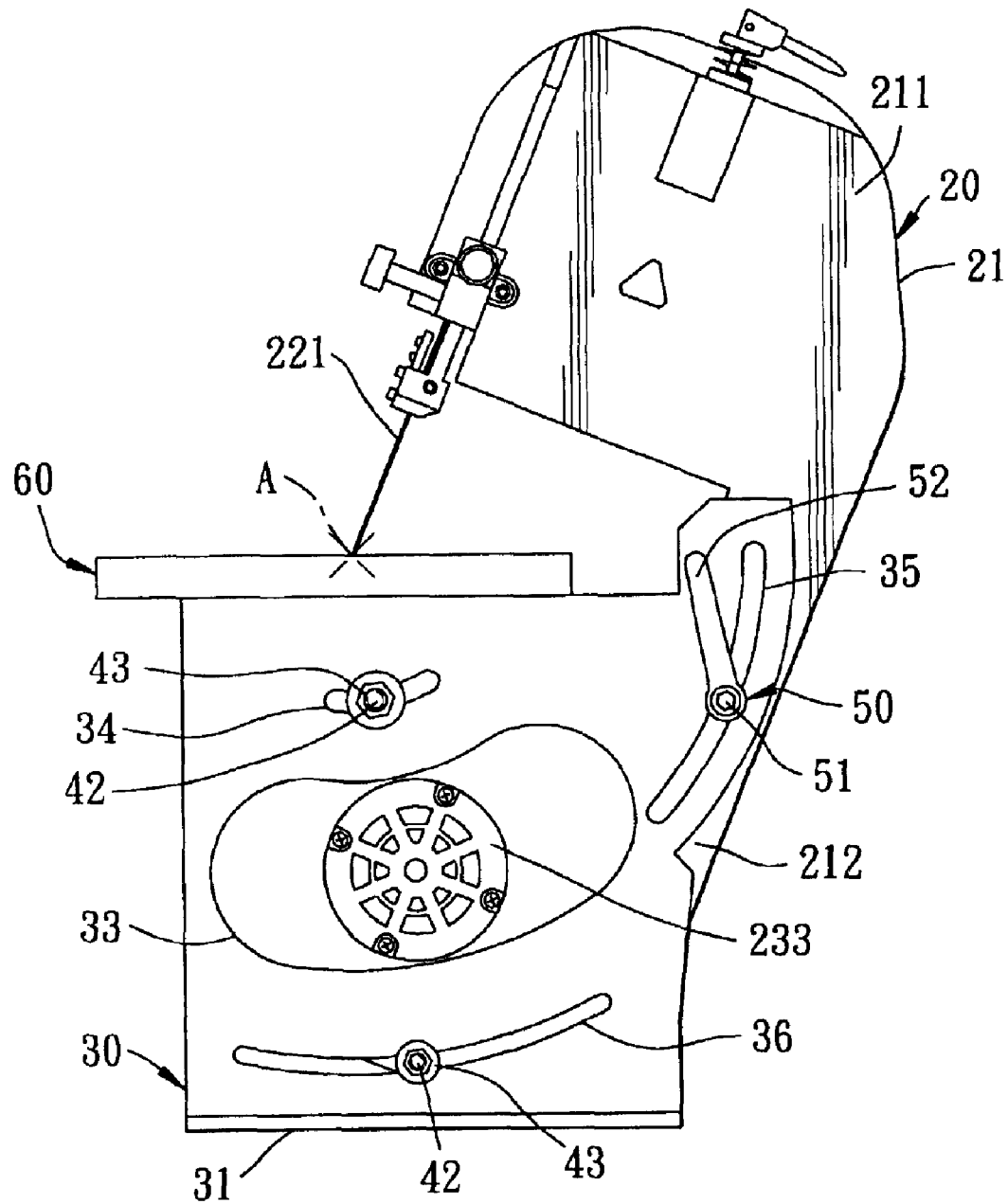
FIG. 7 is a side view of the preferred embodiment when the column is in an inclined position.

A table 60 includes a horizontal support wall which is adapted to support a workpiece thereon, and which extends into the working space 213. The table 60 is mounted relative to the column 20 such that the front sawing portion 221 of the saw blade 22 intersects the horizontal support wall with an included angle facing towards the rear body 21, and at a centerline (A) which is parallel to the first axis. In addition, the column 20 is turnable about the centerline (A) between a normal position, as shown in FIG. 6, where the included angle is 90 degrees, and an inclined position, as shown in FIG. 7, where the included angle is an obtuse or acute angle.

A frame post 30 includes a bottom end 31 adapted to be positioned on a ground surface, and a major mounting wall 39 which extends from the bottom end 31 in an upright direction that is parallel to the longitudinal direction when the column 20 is in the normal position, and which terminates at an upper end 32 which is secured on the horizontal support wall of the table 60. The major mounting wall 39 has left and right lateral surfaces 391,392 opposite to each other in the second direction. The left lateral surface 391 is disposed to confront the column 20, and has four key slots 33,34,35,36 in form of arcuate grooves, each of which extends to communicate with the right lateral surface 392 and each of which is configured to confine a guiding route A1,A2,A3,A4 that is arcuate about the centerline (A). The distal end of the motor housing 233 projects through the key slot 33 to retainingly move along the guiding route A1.

Figure 3:
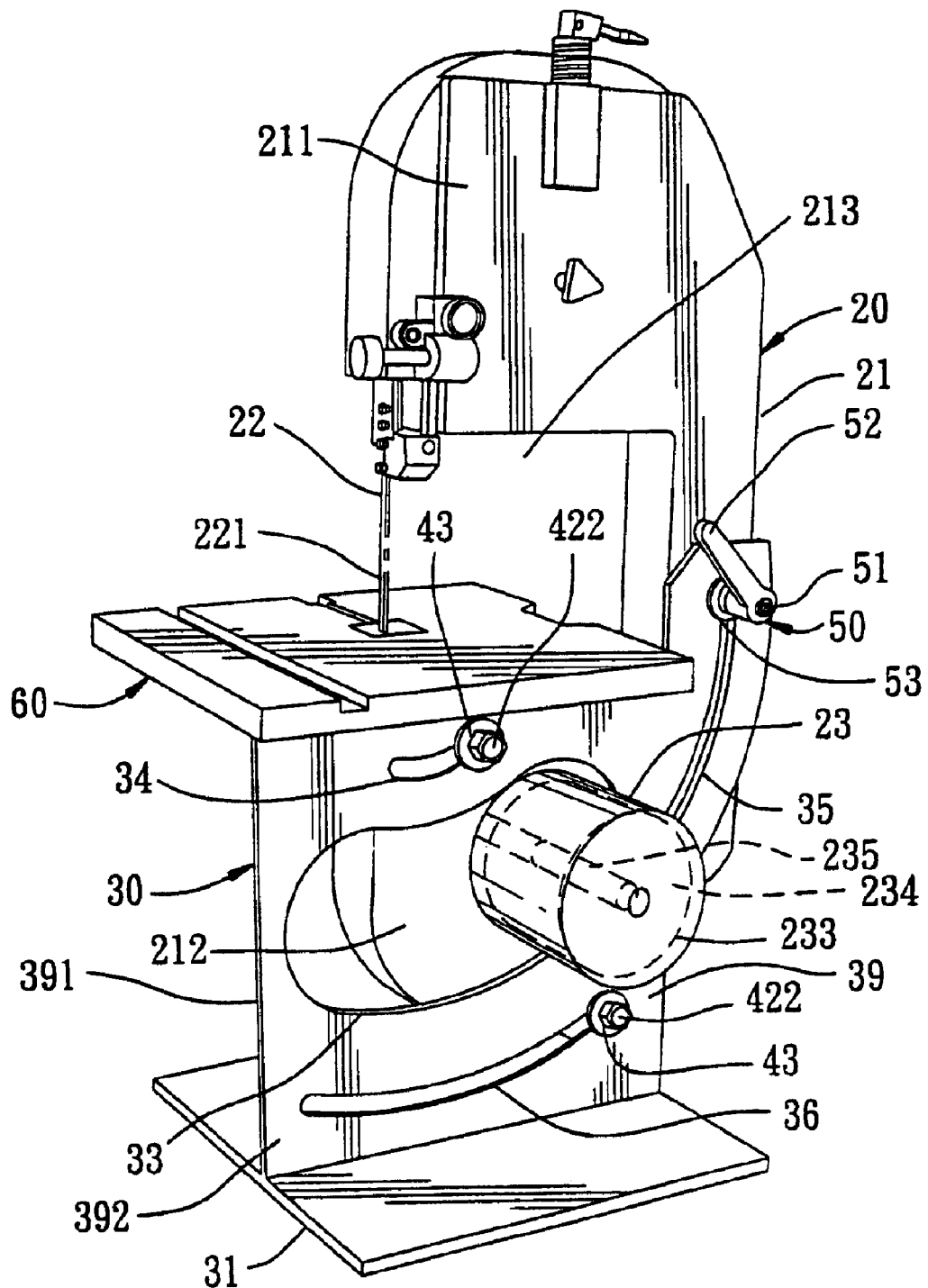
FIG. 3 is a perspective view of a preferred embodiment of a vertical saw machine according to this invention.
Figure 4:
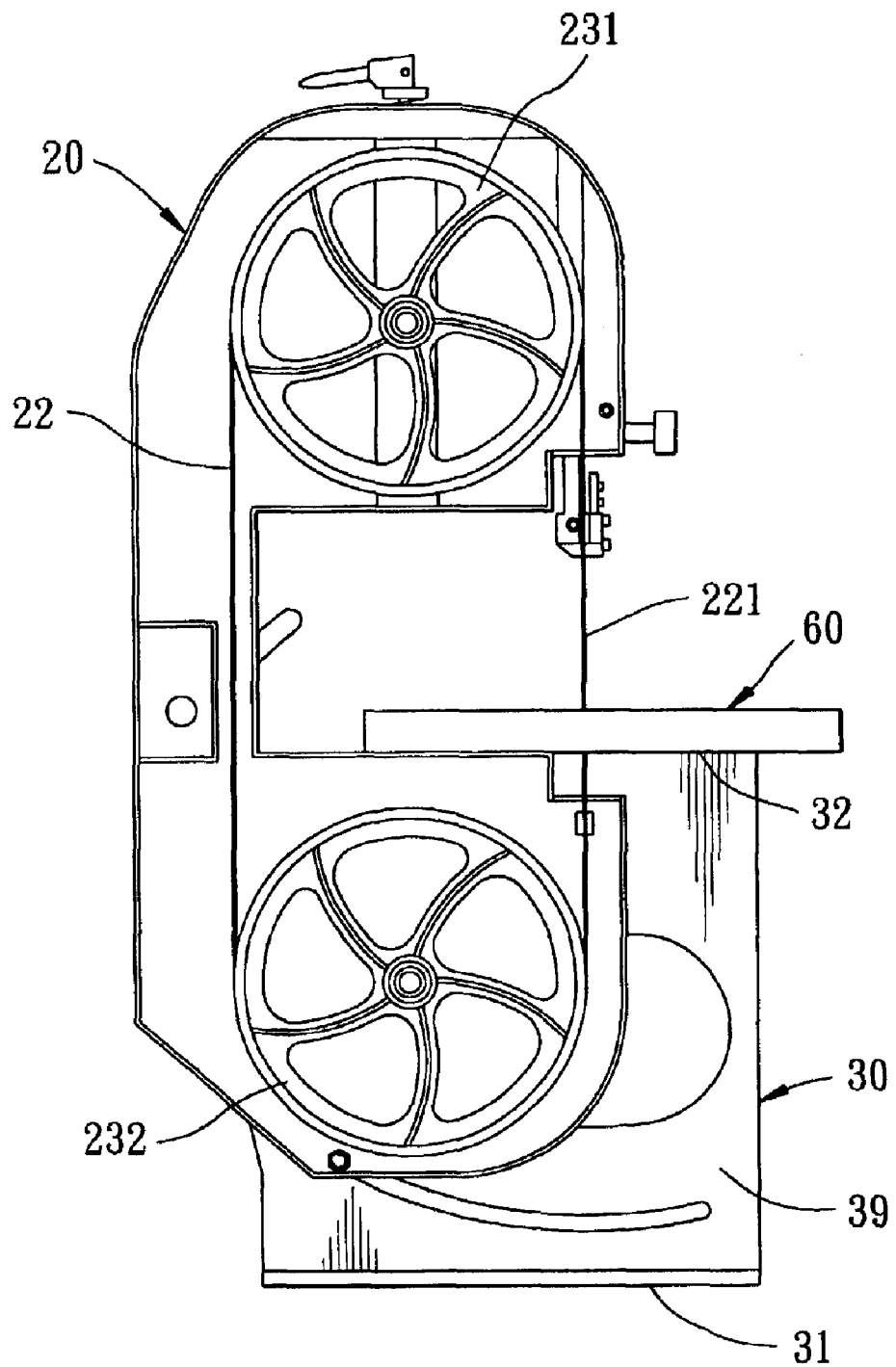
FIG. 4 is a side schematic view showing a blade mounting pulley assembly and a band saw blade mounted on a column of the preferred embodiment.
Figure 5:
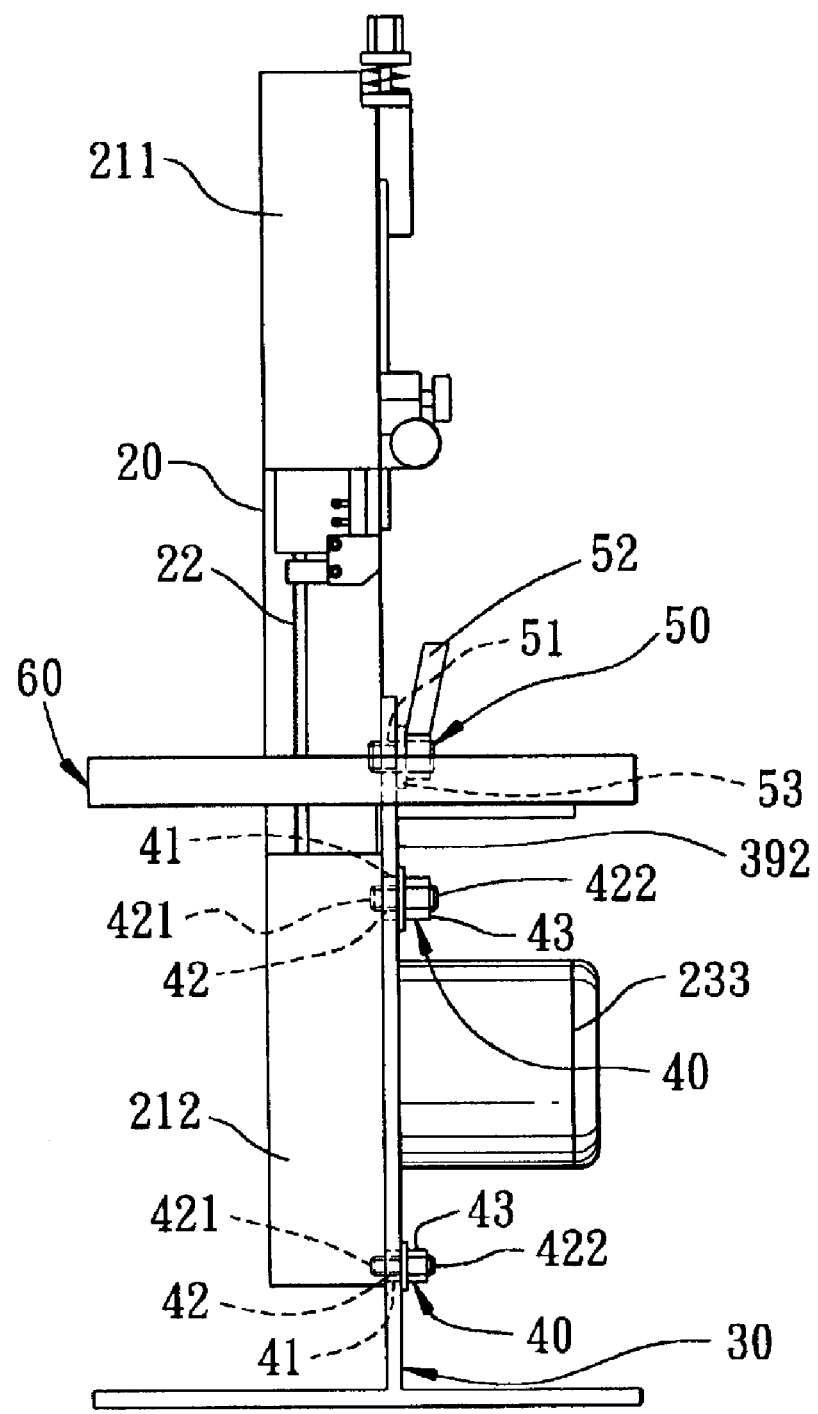
FIG. 5 is a front schematic view of the preferred embodiment.

With reference to FIGS. 3 and 5, each of two key members 40 includes a sleeve 41 which is disposed in the respective key slot 34,36, and a rod 42 with a threaded inner end 421 which passes through the sleeve 41 and which is inserted threadedly into the lower support 212, and a threaded outer end portion 422 which engages threadedly a threaded nut 43 so as to retain the column 20 relative to the frame post 30 and to permit turning of the column 20 between the normal and inclined positions only.

Further, a locking member 50 includes a threaded bolt 51 which has a proximate end with an externally threaded portion formed thereon to engage threadedly an internally threaded portion formed in the lower support 212, and a distal end which projects through the key slot 35, which has an enlarged portion formed thereon, and which has a washer 53 sleeved thereon to abut against the right lateral surface 392 so as to fasten the lower support 212 relative to the frame past 30 and thus to lock the column 20 in one of the normal and inclined positions.

A lever 52 is disposed on the enlarged portion of the threaded bolt 51, and is operable to release the lower support 212 such that the column 20 is turnable to adjust the included angle by virtue of guidance of the motor housing 233, the key members 40 and the locking member 50 which move along the guiding routes A1,A2,A4,A3 and between first and second points correspond to the normal and inclined positions. As such, an included angle of the front sawing portion 221 of the saw blade 22 relative to the table 60 can be adjusted as desired. Moreover, the workpiece can be supported steadily on the horizontal support wall of the table 60.

Figure 8:
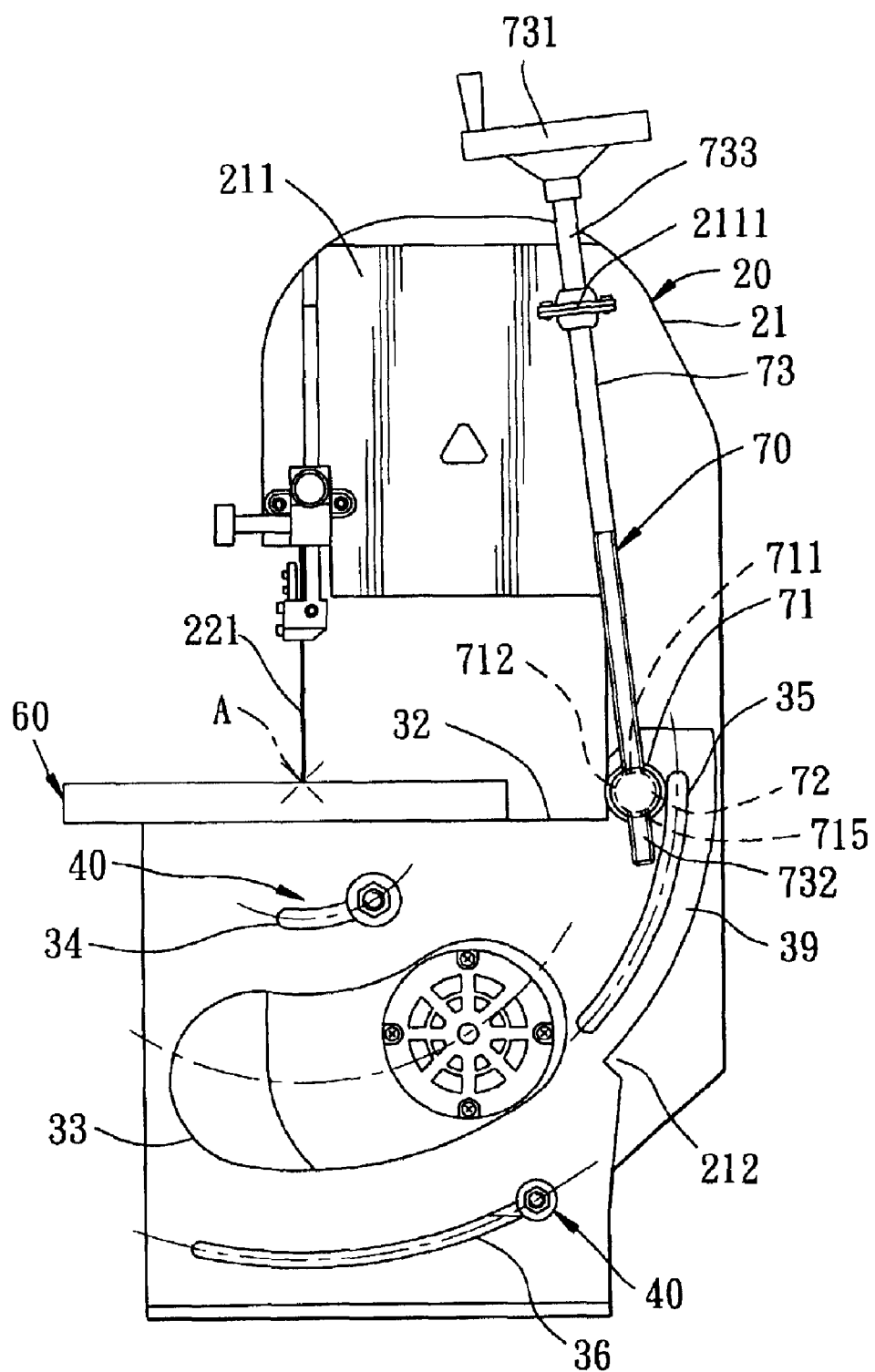
FIG. 8 is a side view of another preferred embodiment of the vertical saw machine according to this invention in a normal state.
Figure 9:
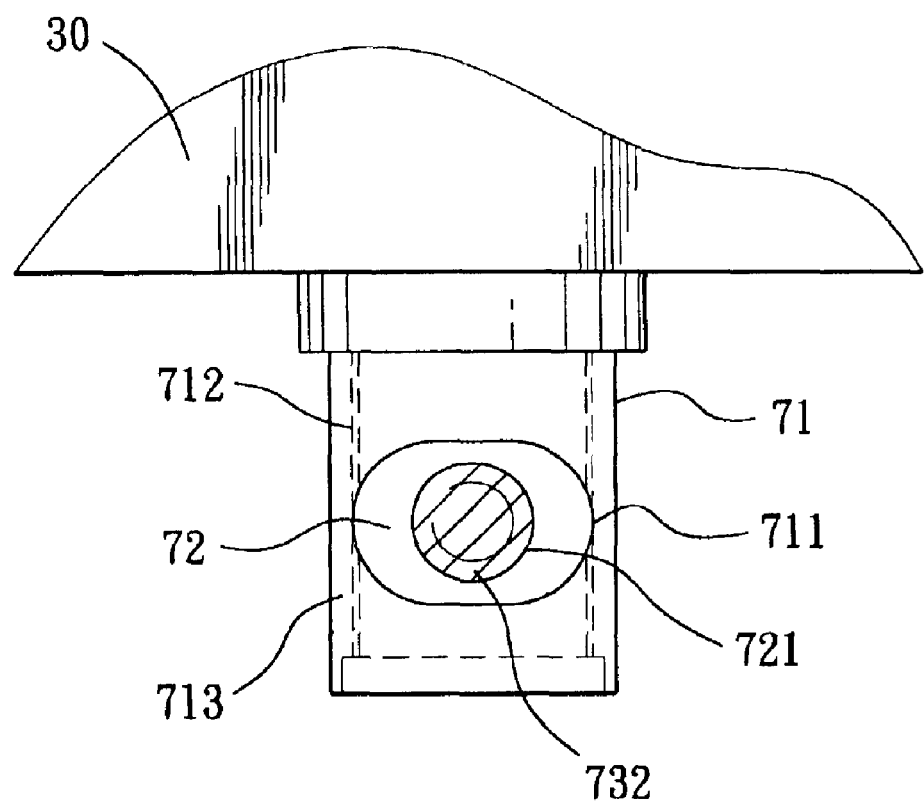
FIG. 9 is a partly sectional view of a rotary adjustment unit of the preferred embodiment of FIG. 8.
Figure 10:
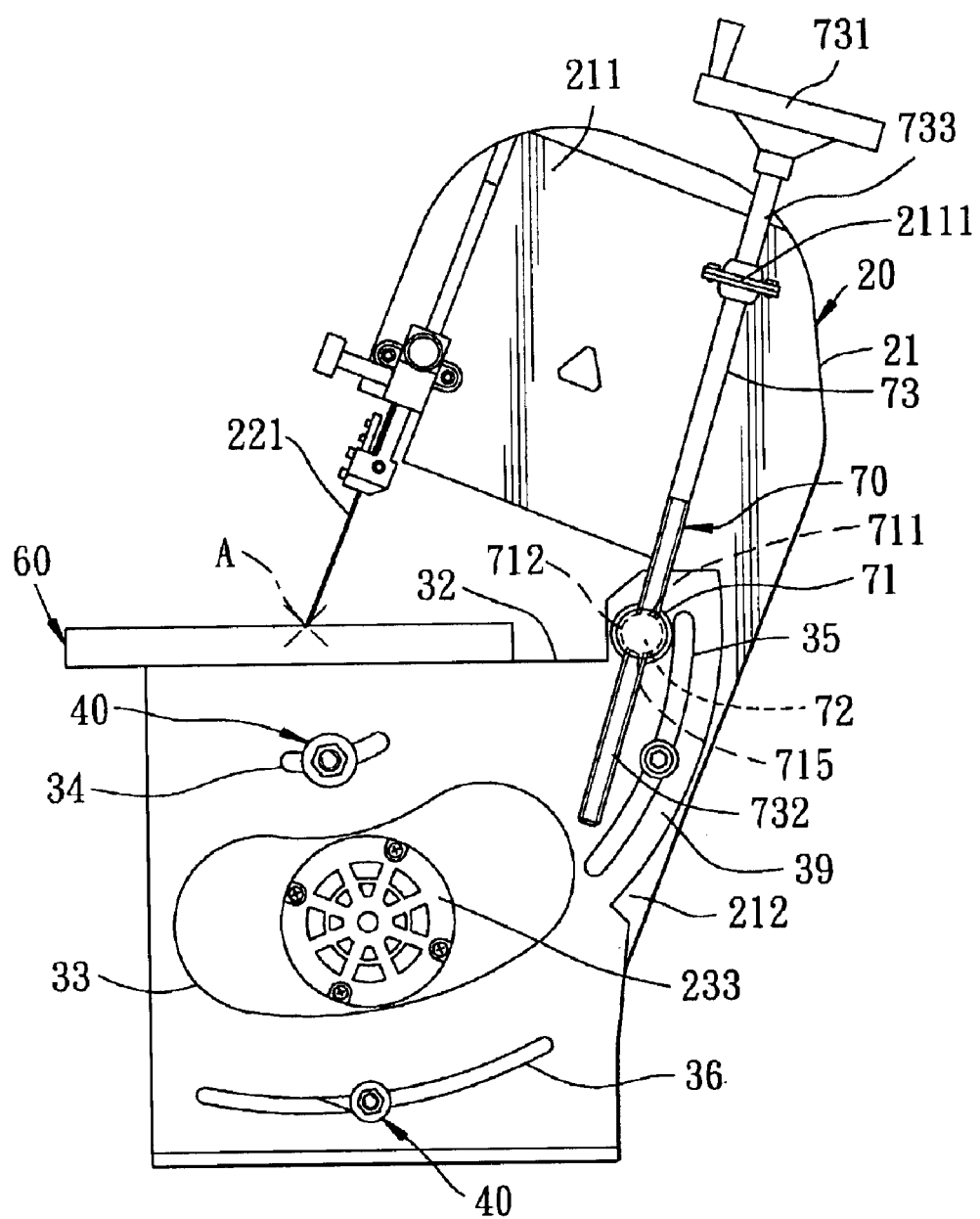
FIG. 10 is a side elevational view of the preferred embodiment of FIG. 8 in an inclined state.

Referring to FIGS. 8 to 10, another preferred embodiment of the vertical saw machine is shown to further comprise a rotary adjustment unit 70 which includes a tubular support mount 71, a tubular body 72 and an adjustment rod 73.

The support mount 71 is secured on and extends from the major mounting wall 39 of the frame post 30 adjacent to the upper end 32 and rearwardly of the centerline (A). The support mount 71 has a surrounding wall 713 which surrounds a second axis that is parallel to the first axis. The surrounding wall 713 has an inner surrounding surface which confines an axial hole 712, and an outer surrounding surface which has two arcuate holes 711,715 that are formed therein, that extend through the inner surrounding surface, and that are arcuate about the second axis. The arcuate holes 711,715 are diametrically opposite to each other in a third axis that is radial to the second axis.

The tubular body 72 is mounted in the axial hole 712, and is rotatable relative to the support mount 71 about the second axis. The tubular body 72 has an annular inner threaded wall 721 to confine a bore which extends diametrically and through the tubular body 72 and along the third axis.

The adjustment rod 73 extends along the third axis, and includes an upper segment 733 which is mounted at an anchoring point 2111 on the upper support 211, which is rotatable relative to the upper support 211 about the third axis, and which is provided with a steering wheel 731, and a lower threaded segment 732 which is opposite to the upper segment 733 along the third axis, which passes through the arcuate holes 711,715, and which is in threaded engagement with the annular inner threaded wall 721 of the tubular body 72. As such, referring to FIGS. 8 and 10, by operating the steering wheel 731, the upper segment 733 will rotate clockwise or counterclockwise to bring the upper segment 733 to move towards or away from the tubular body 72 so as to vary the length of the adjustment rod 70 between the anchoring point 2111 and the tubular body 72, thereby turning the upper segment 733 about the second axis and thereby moving the upper support 211 between the normal and inclined positions. Thus, the included angle of the front sawing portion 221 of the saw blade 22 relative to the table 60 can be adjusted accurately and conveniently.

Although the invention has been illustrated using a vertical band saw machine as an example, it is noted that the invention is not limited thereto and covers any powered sawing machine that has a saw blade capable of reciprocating motion in an upright direction, such as a scroll saw machine.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A vertical saw machine comprising:
   a column including a rear body which has upper and lower ends opposite to each other in a longitudinal direction, and upper and lower supports which respectively extend from said upper and lower ends forwardly and in a first direction transverse to the longitudinal direction, and which are spaced apart from each other in the longitudinal direction to confine a working space therebetween;

a motor having an output shaft to deliver a drive force;

a saw blade driven by the drive force of said output shaft, and having a sawing portion which runs along a running route that extends from said upper support to said lower support and that is spaced apart from said rear body in the first direction;

a table including a horizontal support wall for supporting a workpiece thereon which extends into said working space, said table being mounted relative to said column such that said sawing portion intersects said horizontal support wall with an included angle facing towards said rear body, and at a centerline which is oriented in a second direction that is transverse to both the longitudinal direction and the first direction, and such that said column is turnable about the centerline between a normal position, where the included angle is 90 degrees, and an inclined position, where the included angle is an obtuse or acute angle;

a frame post including a bottom end positioned on a ground surface, and a major mounting wall extending from said bottom end in an upright direction which is parallel to the longitudinal direction when said column is in the normal position, and terminating at an upper end which is proximate to said horizontal support wall, said major mounting wall having first and second lateral surfaces opposite to each other in the second direction, said first lateral surface being disposed to confront said column, and having a key slot which extends towards said second lateral surface and which is configured to confine a guiding route that is arcuate about the centerline; and a key member having a proximate end secured to said column, and a distal end extending from said proximate end in the second direction such that said distal end is retainingly guided to move along said guiding route and between first and second points which correspond to the normal and inclined positions; and a blade mounting pulley driven by the drive force of said output shaft, and disposed on and rotatable relative to said column about a first axis that is parallel to the centerline, wherein said saw blade is an endless band saw blade trained on said blade mounting pulley so as to be driven by the drive force of said output shaft to run, in sequence, alone said lower support, said rear body and said upper support, and then along said running route to form an endless route, said key slot extends to communicate with said second lateral surface, and said key member includes a motor housing which receives said motor therein and which is mounted on said lower support, said motor housing extending in the second direction and projecting through said key slot to retainingly move alone said guiding route.

2. The vertical saw machine of claim 1, further comprising a support mount disposed on said frame post adjacent to said upper end and rearwardly of the centerline;

a tubular body mounted to be rotatable relative to said support mount about a second axis which is parallel to the centerline, and having an annular inner threaded wall to confine a bore which extends diametrically and through said tubular body and along a third axis that is radial to the second axis; and an adjustment rod extending along the third axis, and including an upper segment which is mounted at an anchoring point on said upper support and which is rotatable relative to said upper support about the third axis, and a lower threaded segment which is opposite to said upper segment along the third axis, and which is in threaded engagement with said annular inner threaded wall such that clockwise or counterclockwise rotation of said upper segment will bring said upper segment to move towards or away from said tubular body so as to vary the length of said adjustment rod between said anchoring point and said tubular body, thereby turning said upper segment about the second axis and thereby moving said upper support between the normal and inclined positions.

3. The vertical saw machine of claim 2, wherein said support mount is tubular, and has a surrounding wall surrounding the second axis, said surrounding wall having an inner surrounding surface which confines an axial hole for receiving rotatably said tubular body, and an outer surrounding surface which has two arcuate holes that are formed therein, that extend through said inner surrounding surface to be communicated with said axial hole, and that are arcuate about the second axis, said arcuate holes being opposite to each other in the third axis for passage of said lower threaded segment of said adjustment rod.

4. A vertical saw machine comprising:

a column including a rear body which has upper and lower ends opposite to each other in a longitudinal direction, and upper and lower supports which respectively extend from said upper and lower ends forwardly and in a first direction transverse to the longitudinal direction, and which are spaced apart from each other in the longitudinal direction to confine a working space therebetween;

a motor having an output shaft to deliver a drive force;

a saw blade driven by the drive force of said output shaft, and having a sawing portion which runs along a running route that extends from said upper support to said lower support and that is spaced apart from said rear body in the first direction;

a table including a horizontal support wall for supporting a workpiece thereon which extends into said working space, said table being mounted relative to said column such that said sawing portion intersects said horizontal support wall with an included angle facing towards said rear body, and at a centerline which is oriented in a second direction that is transverse to both the longitudinal direction and the first direction, and such that said column is turnable about the centerline between a normal position, where the included angle is 90 degrees, and an inclined position, where the included angle is an obtuse or acute angle;

a frame post including a bottom end positioned on a ground surface, and a major mounting wall extending from said bottom end in an upright direction which is parallel to the longitudinal direction when said column is in the normal position, and terminating at an upper end which is proximate to said horizontal support wall, said major mounting wall having first and second lateral surfaces opposite to each other in the second direction, said first lateral surface being disposed to confront said column, and having a key slot in the form of an arcuate groove which extends towards said second lateral surface and which is configured to confine a guiding route that is arcuate about the centerline;

a key member having a proximate end secured to said column, and a distal end extending from said proximate end in the second direction such that said distal end is retainingly guided to move along said guiding route and between first and second points which correspond to the normal and inclined positions;

a blade mounting pulley driven by the drive force of said output shaft, and disposed on and rotatable relative to said column about a first axis that is parallel to the centerline, and wherein said saw blade is an endless band saw blade trained on said blade mounting pulley so as to be driven by the drive force of said output shaft to run, in sequence, along said lower support, said rear body and said upper support, and then along said running route to form an endless route, wherein said key slot extends to communicate with said second lateral surface;

a locking member disposed to lock said column in one of the normal and inclined positions, said locking member including an internally threaded portion formed in said lower support and confronting said left lateral surface, an externally threaded portion formed on said proximate end of said key member, and threadedly engagable with said internally threaded portion, and an enlarged portion formed on said distal end which is configured to abut against said major mounting wall to fasten said lower support relative to said frame post once said external threaded portion engages threadedly said internally threaded portion.

* * * * *